(12) United States Patent
Yu et al.

(10) Patent No.: US 12,278,569 B2
(45) Date of Patent: Apr. 15, 2025

(54) SYSTEMS AND METHODS FOR INVERTER AND DC/DC CONVERTER OPERATION

(71) Applicant: SCHNEIDER ELECTRIC IT CORPORATION, Foxboro, MA (US)

(72) Inventors: Qinghong Yu, Carlisle, MA (US); Jing Huang, Andover, MA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 5 days.

(21) Appl. No.: 18/226,316

(22) Filed: Jul. 26, 2023

(65) Prior Publication Data
US 2024/0063722 A1 Feb. 22, 2024

Related U.S. Application Data

(60) Provisional application No. 63/399,296, filed on Aug. 19, 2022.

(51) Int. Cl.
*H02M 3/335* (2006.01)
*H02J 9/06* (2006.01)

(52) U.S. Cl.
CPC ......... *H02M 3/33576* (2013.01); *H02J 9/062* (2013.01)

(58) Field of Classification Search
CPC .. H02M 3/33576; H02M 1/0095; H02M 3/01; H02M 3/33571; H02M 3/33573; H02M 3/33584; H02M 3/33592; H02M 7/4837; H02M 7/487; H02J 9/062
USPC .......................................................... 307/22
See application file for complete search history.

(56) References Cited

U.S. PATENT DOCUMENTS

| | | | |
|---|---|---|---|
| 7,237,634 B2 | 7/2007 | Severinsky et al. | |
| 8,994,217 B2 | 3/2015 | Cho et al. | |
| 10,562,404 B1 | 2/2020 | Khaligh et al. | |
| 10,574,084 B2 | 2/2020 | Ghosh et al. | |
| 10,581,342 B2 * | 3/2020 | Zhang | H02M 7/5395 |
| 2021/0257852 A1 * | 8/2021 | Toyoda | H02J 9/062 |
| 2022/0038029 A1 | 2/2022 | Prakash et al. | |

FOREIGN PATENT DOCUMENTS

WO 2019013905 A1 1/2019

OTHER PUBLICATIONS

Extended European Search Report from corresponding European Application No. 23191934.1 dated Jan. 30, 2024.
Teston, S. A. et al., "ANPC Inverter with Integrated Secondary Bidirectional Dc Port for ESS Connection", IEEE Transactions on Industry Applications, IEEE Service Center, Piscataway, NJ, US, vol. 55, No. 6, Nov. 1, 2019 (Nov. 1, 2019), pp. 7358-7367, XP011755048, ISSN: 0093-9994, DOI: 10.1109/TIA.2019.2926954 [retrieved on Nov. 11, 2019].

* cited by examiner

*Primary Examiner* — Richard Tan
(74) *Attorney, Agent, or Firm* — Lando & Anastasi, LLP

(57) ABSTRACT

Examples of the disclosure include a power system comprising a power-system output configured to be coupled to, and provide an output AC waveform to, one or more loads, a positive DC bus, a negative DC bus, an inverter coupled to the positive DC bus and the negative DC bus, the inverter including an inverter output coupled to the power-system output, and a DC/DC converter coupled between the inverter output and at least one of the positive DC bus or the negative DC bus.

19 Claims, 7 Drawing Sheets

SYSTEMS AND METHODS FOR INVERTER AND DC/DC CONVERTER OPERATION

CROSS-REFERENCE TO RELATED APPLICATIONS

This application claims priority under 35 U.S.C. § 119(e) to U.S. Provisional Application Ser. No. 63/399,296, titled SYSTEMS AND METHODS FOR INVERTER AND DC/DC CONVERTER OPERATION, filed on Aug. 19, 2022, which is hereby incorporated by reference in its entirety.

BACKGROUND

1. Field of the Disclosure

At least one example in accordance with the present disclosure relates generally to power devices.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

At least one example in accordance with the present disclosure relates generally to power-conversion systems. Power devices such as uninterruptible power supplies (UPSs) may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

According to at least one aspect of the present disclosure, a power system is provided comprising a power-system output configured to be coupled to, and provide an output AC waveform to, one or more loads, a positive DC bus, a negative DC bus, an inverter coupled to the positive DC bus and the negative DC bus, the inverter including an inverter output coupled to the power-system output, and a DC/DC converter coupled between the inverter output and at least one of the positive DC bus or the negative DC bus.

In some examples, the inverter is coupled between the positive DC bus and the negative DC bus and the DC/DC converter. In various examples, the inverter is configured to isolate the DC/DC converter from at least one of the positive DC bus or the negative DC bus. In at least one example, the power system includes at least one controller coupled to the inverter and the DC/DC converter, wherein the at least one controller is configured to control, during a positive portion of the output AC waveform, the inverter to isolate the DC/DC converter from the negative DC bus. In some examples, the at least one controller is further configured to control, during a negative portion of the output AC waveform, the inverter to isolate the DC/DC converter from the positive DC bus.

In various examples, the power system includes at least one controller coupled to the inverter and the DC/DC converter, wherein the power-system output is configured to provide an output AC waveform to the one or more loads, and wherein the at least one controller is configured to control, during a negative portion of the output AC waveform, the inverter to isolate the DC/DC converter from the positive DC bus. In at least one example, the inverter includes a first plurality of inverter switches coupled between at least one node and the positive DC bus and the negative DC bus, and a second plurality of inverter switches coupled between the at least one node and the inverter output. In some examples, the DC/DC converter includes a plurality of converter switches coupled to the at least one node.

In various examples, the power system includes at least one controller coupled to the inverter and the DC/DC converter, the at least one controller being configured to control, during a positive portion of the output AC waveform, the first plurality of inverter switches to couple the positive DC bus to the plurality of converter switches. In at least one example, the at least one controller is further configured to control, during the positive portion of the output AC waveform, the first plurality of inverter switches to isolate the negative DC bus from the plurality of converter switches. In some examples, the power system includes at least one controller coupled to the inverter and the DC/DC converter, the at least one controller being configured to control, during a negative portion of the output AC waveform, the first plurality of inverter switches to couple the negative DC bus to the plurality of converter switches.

In various examples, the power system includes at least one controller coupled to the inverter and the DC/DC converter, wherein the DC/DC converter includes a transformer, and wherein the at least one controller is configured to control the first plurality of inverter switches to couple the transformer to at most one of the positive DC bus or the negative DC bus at any time during at least a positive portion or a negative portion of the AC output waveform. In at least one example, the power system includes at least one controller coupled to the second plurality of inverter switches, wherein the at least one controller is configured to control the second plurality of inverter switches to produce a positive portion of the output AC waveform using DC power derived from the positive DC bus. In some examples, the at least one controller is configured to control the first plurality of inverter switches to couple the positive DC bus to the second plurality of inverter switches during the positive portion of the output AC waveform.

According to aspects of the disclosure, a method of controlling a power system including a positive DC bus, a negative DC bus, an output, an inverter, and a DC/DC converter coupled between the output and the inverter is provided, the method comprising controlling the inverter to provide an output AC waveform to the output, controlling, during a positive portion of the output AC waveform, the inverter to couple the positive DC bus to the DC/DC converter, and controlling, during the positive portion of the output AC waveform, the inverter to isolate the negative DC bus from the DC/DC converter.

In some examples, the method includes controlling, during a negative portion of the output AC waveform, the inverter to couple the negative DC bus to the DC/DC converter, and controlling, during the negative portion of the output AC waveform, the inverter to isolate the positive DC bus from the DC/DC converter. In various examples, the inverter includes at least one first inverter switch and at least one second inverter switch, and wherein controlling the inverter to couple the positive DC bus to the DC/DC converter includes closing the at least one first inverter switch, and controlling the inverter to isolate the negative DC bus from the DC/DC converter includes opening the at least one second inverter switch. In at least one example, the inverter includes at least one third inverter switch, and controlling the inverter to provide the output AC waveform to the output includes controlling the at least one third inverter switch to produce the output AC waveform using DC power derived from at least one of the positive DC bus or the negative DC bus.

According to aspects of the disclosure, a non-transitory computer-readable medium storing thereon sequences of computer-executable instructions for controlling a power system including a positive DC bus, a negative DC bus, an output, an inverter, and a DC/DC converter coupled between the output and the inverter is provided, the sequences of computer-executable instructions including instructions that instruct at least one processor to control the inverter to provide an output AC waveform to the output, control, during a positive portion of the output AC waveform, the inverter to couple the positive DC bus to the DC/DC converter, and control, during the positive portion of the output AC waveform, the inverter to isolate the negative DC bus from the DC/DC converter.

In some examples, the instructions further instruct the at least one processor to control, during a negative portion of the output AC waveform, the inverter to couple the negative DC bus to the DC/DC converter, and control, during the negative portion of the output AC waveform, the inverter to isolate the positive DC bus from the DC/DC converter.

According to aspects of the disclosure, a power system is provided comprising a power-system output configured to be coupled to, and provide an output AC waveform to, one or more loads, a positive DC bus, a negative DC bus, an inverter coupled to the positive DC bus and the negative DC bus, the inverter including an inverter output coupled to the power-system output, and a DC/DC converter coupled between the inverter output and at least one of the positive DC bus or the negative DC bus.

In at least one example, the positive DC bus and the negative DC bus are configured to be coupled to at least one energy-storage device. In at least one example, the DC/DC converter is configured to execute one or both of providing, via at least one of the positive DC bus or the negative DC bus, output power to the at least one energy-storage device, and receiving, via at least one of the positive DC bus or the negative DC bus, input power from the at least one energy-storage device. In at least one example, the output AC waveform includes a positive cycle and a negative cycle, and wherein the inverter is configured to provide, during the positive cycle, positive-voltage power to the DC/DC converter, and provide, during the negative cycle, negative-voltage power to the DC/DC converter.

In at least one example, the inverter includes a plurality of switches coupled between the inverter output and the power-system output. In at least one example, the inverter includes a snubber capacitor coupled in parallel with the plurality of switches. In at least one example, the inverter further comprises a first set of one or more inverter switches coupled to a positive-DC-power source at a first connection and to the plurality of switches at a second connection, and a second set of one or more inverter switches coupled to a negative-DC-power source at a third connection and to the plurality of switches at a fourth connection.

In at least one example, the inverter further comprises a first set of one or more inverter switches coupled to a positive-DC-power source at a first connection and to the inverter output at a second connection, and a second set of one or more inverter switches coupled to a negative-DC-power source at a third connection and to the inverter output at a fourth connection. In at least one example, the inverter further comprises a set of one or more inverter switches coupled to a power source at a first connection and to the inverter output at a second connection. In at least one example, the power source includes a capacitor, and wherein the set of one or more inverter switches is coupled in parallel with the capacitor.

According to aspects of the disclosure, a non-transitory computer-readable medium storing thereon sequences of computer-executable instructions for controlling a power system including a positive DC bus, a negative DC bus, an output, an inverter, and a DC/DC converter coupled between the output and the inverter is provided, the sequences of computer-executable instructions including instructions that instruct at least one processor to control the inverter to provide an output AC waveform to the output, control, during a positive portion of the output AC waveform, the inverter to couple the positive DC bus to the DC/DC converter, and control, during the positive portion of the output AC waveform, the inverter to isolate the negative DC bus from the DC/DC converter.

In at least one example, the instructions further instruct the at least one processor to control, during a negative portion of the output AC waveform, the inverter to couple the negative DC bus to the DC/DC converter, and control, during the negative portion of the output AC waveform, the inverter to isolate the positive DC bus from the DC/DC converter. In at least one example, the instructions further instruct the at least one processor to control, during the negative portion of the output AC waveform, the DC/DC converter to provide power derived from the negative DC bus to at least one energy-storage device. In at least one example, the instructions further instruct the at least one processor to control, during the positive portion of the output AC waveform, the DC/DC converter to provide power derived from the positive DC bus to at least one energy-storage device.

In at least one example, the instructions further instruct the at least one processor to control, during the positive portion of the output AC waveform, the inverter to draw power from the positive DC bus, provide a first portion of the drawn power to the output, and provide a second portion of the drawn power to the DC/DC converter. In at least one example, the instructions further instruct the at least one processor to control, during the negative portion of the output AC waveform, the inverter to draw power from the negative DC bus, provide a first portion of the drawn power to the output, and provide a second portion of the drawn power to the DC/DC converter.

According to aspects of the disclosure, a method of controlling a power system including a positive DC bus, a negative DC bus, an output, an inverter, and a DC/DC converter coupled between the output and the inverter is provided, the method comprising controlling the inverter to provide an output AC waveform to the output, controlling, during a positive portion of the output AC waveform, the inverter to couple the positive DC bus to the DC/DC converter, and controlling, during the positive portion of the output AC waveform, the inverter to isolate the negative DC bus from the DC/DC converter.

In at least one example, the method includes controlling, during a negative portion of the output AC waveform, the inverter to couple the negative DC bus to the DC/DC converter, and controlling, during the negative portion of the output AC waveform, the inverter to isolate the positive DC bus from the DC/DC converter. In at least one example, the method includes controlling, during the negative portion of the output AC waveform, the DC/DC converter to provide power derived from the negative DC bus to at least one energy-storage device. In at least one example, the method includes controlling, during the positive portion of the output AC waveform, the DC/DC converter to provide power derived from the positive DC bus to at least one energy-storage device.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
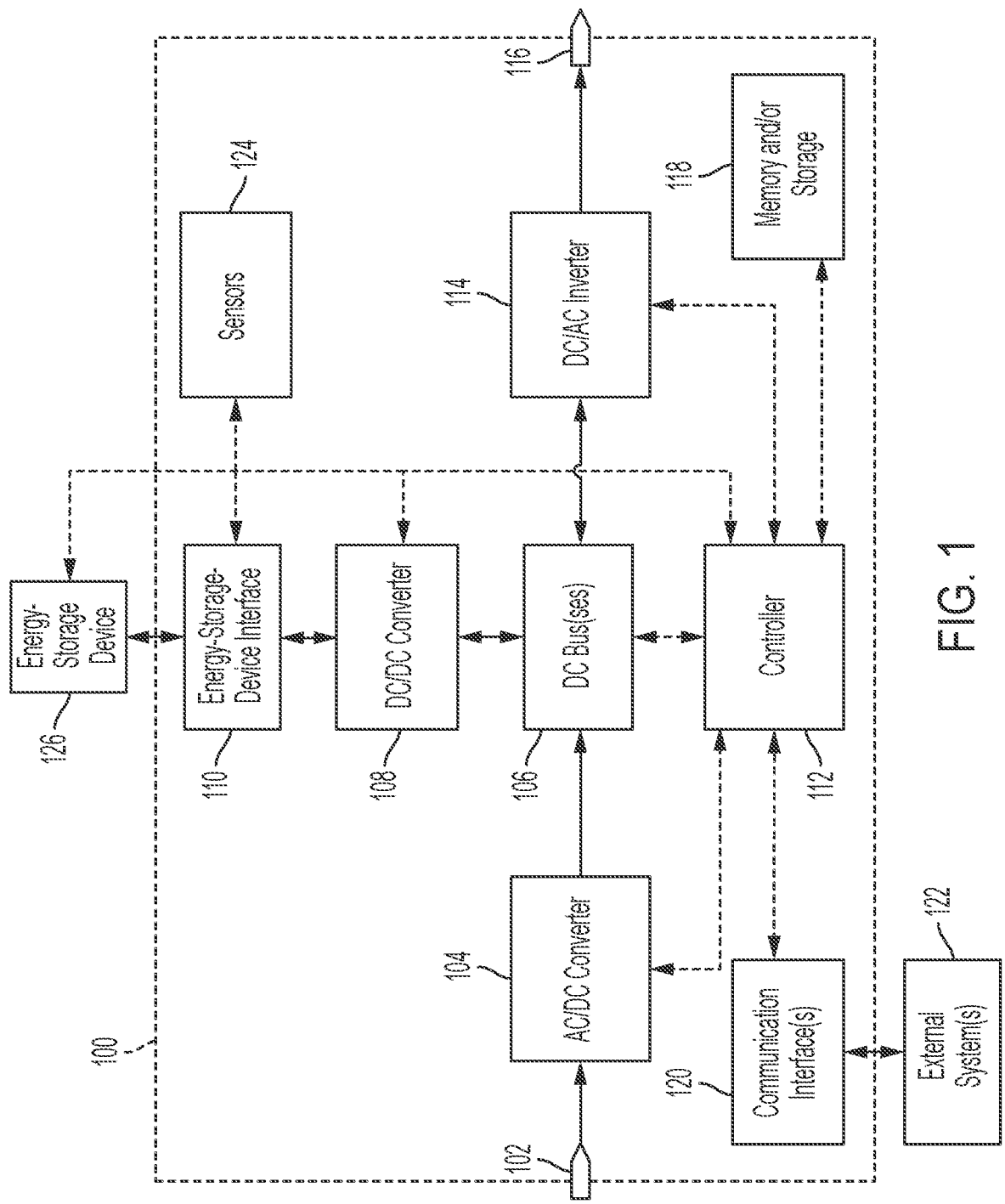
FIG. 1 illustrates a block diagram of an uninterruptible power supply according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Uninterruptible power supplies (UPSs) are configured to provide uninterrupted power to one or more loads. An example UPS may draw power from at least one of several power sources. For example, a UPS may be coupled to a primary power source, such as a utility mains, and to a secondary power source, such as a battery. The primary power source may provide AC power to the UPS. The secondary power source may provide DC power to the UPS. The UPS may draw primary power (for example, AC power) from the primary power source when primary power is available (for example, when acceptable utility-mains power is available) and may draw DC power from the secondary power source when acceptable primary power is not available (for example, when the utility mains is experiencing a blackout condition). The UPS may use the primary and/or secondary power to provide output power to the one or more loads. The UPS may also use the primary power to recharge the secondary power source when, for example, the secondary power source is not fully charged.

The UPS may include power-conversion circuitry to process the primary power, secondary power, and output power. The UPS may also include at least one DC bus (for example, a positive DC bus and a negative DC bus) to interconnect the power-conversion circuitry. For example, the UPS may include an AC/DC converter coupled to the primary power source to convert primary AC power to DC bus power, a DC/DC converter coupled to the secondary power source to convert battery DC power to bus DC power, and a DC/AC inverter coupled to the one or more loads to convert DC bus power to output AC power. In some examples the DC/DC converter may be configured to only convert battery DC power to bus DC power (that is, the DC/DC converter may be "unidirectional"). Separate circuitry, which may be referred to as a "charger," may be provided to convert bus DC power to battery DC power to recharge the battery. In other examples the DC/DC converter may be configured to convert bus DC power to battery DC power (that is, recharging power) in addition to converting battery DC power to bus DC power (that is, the DC/DC converter may be "bidirectional"). A separate charger may thus be omitted in some examples.

One example of a DC/DC converter topology is the dual active bridge (DAB) converter topology, as described in greater detail below. DAB converters may be configured to support bidirectional power conversion between a battery and DC busses, which may be advantageous in certain UPS topologies. For example, DAB converters may be coupled to the positive DC bus and the negative DC bus of the UPS to not only provide bus DC power derived from the battery DC power, but also to draw bus DC power for conversion to battery DC power. However, in certain implementations, DAB converters may be susceptible to voltage imbalances on the positive and negative DC busses. For example, if a voltage imbalance exists between the positive and negative DC busses, a transformer of the DAB converter may become saturated and adversely impact performance of the DAB converter.

Examples of the disclosure provide a DC/AC inverter configured to provide positive-voltage DC power and negative-voltage DC power to a DC/DC converter. During a positive half-cycle of an output AC waveform, a DC/AC inverter may provide positive-voltage DC power to a DC/DC converter but isolate the DC/DC converter from the negative DC bus. During a negative half-cycle of the output AC waveform, the DC/AC inverter may provide negative-voltage DC power to the DC/DC converter but isolate the DC/DC converter from the positive DC bus. Accordingly, rather than being coupled directly to a positive DC bus and a negative DC bus simultaneously, the DC/DC converter may be alternately coupled to the positive DC bus and the negative DC bus. A risk of transformer saturation may therefore be reduced or eliminated by operating the DC/AC inverter to alternately provide positive- and negative-voltage DC power to the DC/DC converter, because a likelihood of imbalanced DC busses being continuously simultaneously coupled to the transformer is reduced or eliminated.

FIG. 1 is a block diagram of a UPS 100 according to an example. The UPS 100 includes an input 102, an AC/DC converter 104, one or more DC busses 106, a DC/DC converter 108, an energy-storage-device interface 110, at least one controller 112 ("controller 112"), a DC/AC inverter 114, an output 116 (also referred to as a "power-system output"), a memory and/or storage 118, one or more communication interfaces 120 ("communication interfaces 120"), which may be communicatively coupled to one or more external systems 122 ("external systems 122"), and one or more voltage sensors and/or current sensors 124 ("sensors 124").

The input 102 is coupled to the AC/DC converter 104 and to an AC power source (not pictured), such as an AC mains power supply. The AC/DC converter 104 is coupled to the input 102 and to the one or more DC busses 106, and is communicatively coupled to the controller 112. The one or more DC busses 106 are coupled to the AC/DC converter 104, the DC/DC converter 108, and to the DC/AC inverter 114, and are communicatively coupled to the controller 112. The DC/DC converter 108 is coupled to the one or more DC busses 106 and to the energy-storage-device interface 110, and is communicatively coupled to the controller 112. The energy-storage-device interface 110 is coupled to the DC/DC converter 108, and is configured to be coupled to at least one energy-storage device 126 and/or another energy-storage device. In some examples, the energy-storage-device interface 110 is configured to be communicatively coupled to the controller 112.

In some examples, the UPS 100 may be external to the at least one energy-storage device 126 and may be coupled to the at least one energy-storage device 126 via the energy-storage-device interface 110. In various examples, the UPS 100 may include one or more energy-storage devices, which may include the energy-storage device 126. The energy-storage device 126 may include one or more batteries, capacitors, flywheels, or other energy-storage devices in various examples.

The DC/AC inverter 114 is coupled to the one or more DC busses 106 and to the output 116, and is communicatively coupled to the controller 112. The output 116 is coupled to the DC/AC inverter 114, and to an external load (not pictured). The controller 112 is communicatively coupled to the AC/DC converter 104, the one or more DC busses 106, the DC/DC converter 108, the energy-storage-device interface 110, the DC/AC inverter 114, the memory and/or storage 118, the communication interfaces 120, and/or the energy-storage device 126. The sensors 124 are communicatively coupled to the controller 112 and may be coupled to one or more other components of the UPS 100, such as the input 102, the AC/DC converter 104, the one or more DC busses 106, the DC/DC converter 108, the energy-storage-device interface 110, the DC/AC inverter 114, and/or the output 116.

The input 102 is configured to be coupled to an AC mains power source and to receive input AC power having an input voltage level. The UPS 100 is configured to operate in different modes of operation based on the input voltage of the AC power provided to the input 102. The controller 112 may determine a mode of operation in which to operate the UPS 100 based on whether the input voltage of the AC power is acceptable. The controller 112 may include or be coupled to one or more sensors, such as the sensors 124, configured to sense parameters of the input voltage. For example, the sensors 124 may include one or more voltage and/or current sensors coupled to the input 102 and being configured to sense information indicative of a voltage at the input 102 and provide the sensed information to the controller 112.

When AC power provided to the input 102 is acceptable (for example, by having parameters, such as an input voltage value, that meet specified values, such as by falling within a range of acceptable input voltage values), the controller 112 controls components of the UPS 100 to operate in an online mode of operation, or "normal mode of operation." In the normal mode of operation, AC power received at the input 102 is provided to the AC/DC converter 104. The AC/DC converter 104 converts the AC power into DC power and provides the DC power to the one or more DC busses 106. The one or more DC busses 106 distribute the DC power to the DC/DC converter 108 and to the DC/AC inverter 114. The DC/DC converter 108 converts the received DC power and provides the converted DC power to the energy-storage-device interface 110. The energy-storage-device interface 110 receives the converted DC power, and provides the converted DC power to the energy-storage device 126 to charge the energy-storage device 126. The DC/AC inverter 114 receives DC power from the one or more DC busses 106, converts the DC power into regulated AC power, and provides the regulated AC power to the output 116 to be delivered to a load.

When AC power provided to the input 102 from the AC mains power source is not acceptable (for example, by having parameters, such as an input voltage value, that do not meet specified values, such as by falling outside of a range of acceptable input voltage values), the controller 112 controls components of the UPS 100 to operate in a backup mode of operation, which may be referred to as an "on-battery mode of operation" in some examples. In the backup mode of operation, DC power is discharged from the energy-storage device 126 to the energy-storage-device interface 110, and the energy-storage-device interface 110 provides the discharged DC power to the DC/DC converter 108. The DC/DC converter 108 converts the received DC power and distributes the DC power amongst the one or more DC busses 106. For example, the DC/DC converter 108 may evenly distribute the power amongst the one or more DC busses 106. The one or more DC busses 106 provide the received power to the DC/AC inverter 114. The DC/AC inverter 114 receives the DC power from the one or more DC busses 106, converts the DC power into regulated AC power, and provides the regulated AC power to the output 116.

In some examples, the sensors 124 may include one or more sensors coupled to one or more of the foregoing components such that a voltage and/or current of one or more of the foregoing components may be determined by the controller 112. The controller 112 may store information in, and/or retrieve information from, the memory and/or storage 118. For example, the controller 112 may store information indicative of sensed parameters (for example, input-voltage values of the AC power received at the input 102) in the memory and/or storage 118. The controller 112 may further receive information from, or provide information to, the communication interfaces 120. The communication interfaces 120 may include one or more communication interfaces including, for example, user interfaces (such as display screens, touch-sensitive screens, keyboards, mice, track pads, dials, buttons, switches, sliders, light-emitting components such as light-emitting diodes, sound-emitting components such as speakers, buzzers, and so forth configured to output sound inside and/or outside of a frequency range audible to humans, and so forth), wired communication interfaces (such as wired ports), wireless communication interfaces (such as antennas), and so forth, configured to exchange information with one or more systems, such as the external systems 122, or other entities, such as human beings. The external systems 122 may include any device, component, module, and so forth, that is external to the UPS 100, such as a server, database, laptop computer, desktop computer, tablet computer, smartphone, central controller or data-aggregation system, other UPS s, and so forth.

Figure 2:
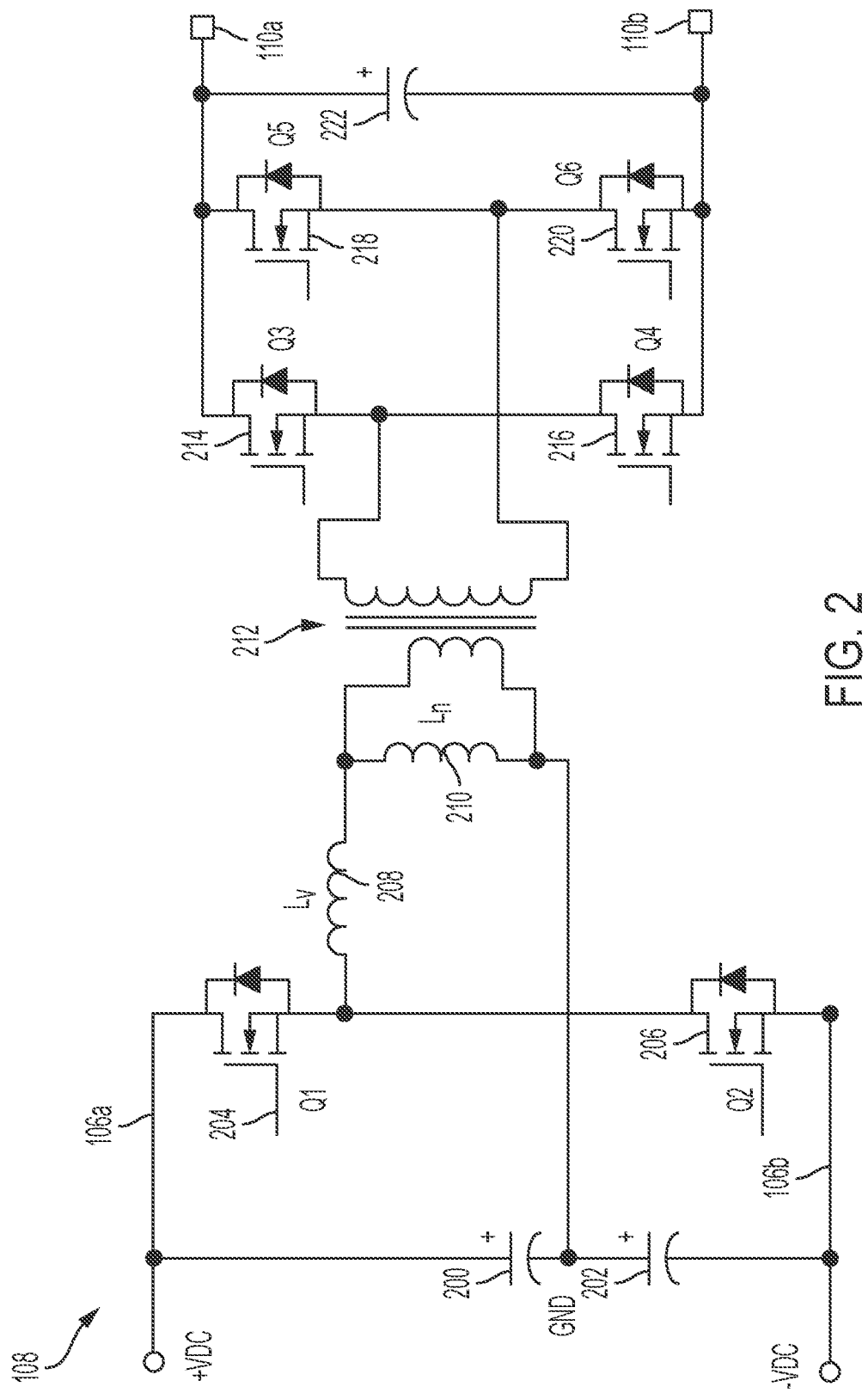
FIG. 2 illustrates a schematic diagram of a DC/DC converter according to an example.

FIG. 2 illustrates a schematic diagram of the DC/DC converter 108 according to an example. The DC/DC converter 108 may be implemented according to any of various topologies. FIG. 2 illustrates one example of the DC/DC converter 108 implemented according to a DAB topology. However, the DC/DC converter 108 is not limited to implementation in a DAB topology, and the illustrated topology is provided for purposes of example only.

The DC/DC converter 108 includes a first bus capacitor 200, a second bus capacitor 202, a first switching device 204, a second switching device 206, a first inductor 208, a second inductor 210, a transformer 212, a third switching device 214, a fourth switching device 216, a fifth switching device 218, a sixth switching device 220, and an output capacitor 222. The DC/DC converter 108 is coupled to a positive DC bus 106a and a negative DC bus 106b, which may be implementations of the one or more DC busses 106. The DC/DC converter 108 is also coupled to a first energy-storage-device-interface connection 110a and a second energy-storage-device-interface connection 110b, which may be implementations of the energy-storage-device interface 110.

The DC/DC converter 108 may operate as a two-stage converter. A first stage includes the first switching device 204 and the second switching device 206, which may be configured in a half-bridge topology. A second stage includes the third switching device 214, the fourth switching device 216, the fifth switching device 218, and the sixth switching device 220, which may be configured in a full-bridge topology. The first stage is connected to the second stage via the transformer 212.

The controller 112 may operate the switching devices 204, 206, 214-220 to convert, via the transformer 212, bus DC power received from the DC busses 106a, 106b to battery DC power provided to the energy-storage-device-interface connections 110a, 110b. Similarly, the controller 112 may operate the switching devices 204, 206, 214-220 to convert, via the transformer 212, battery DC power received from the energy-storage-device-interface connections 110a, 110b to bus DC power provided to the DC busses 106a, 106b.

As discussed above, however, DAB converters may be susceptible to DC-bus-voltage imbalances. For example, if a voltage on the positive DC bus 106a is not balanced with a voltage on the negative DC bus 106b (for example, by not having a substantially equal voltage magnitude relative to a common node, such as ground), the transformer 212 may become saturated. Performance of the transformer 212 may be adversely impacted by saturation. As discussed in greater detail below, a risk of saturation of the transformer 212 may be reduced by integrating the DC/DC converter 108 with the DC/AC inverter 114.

Figure 3:
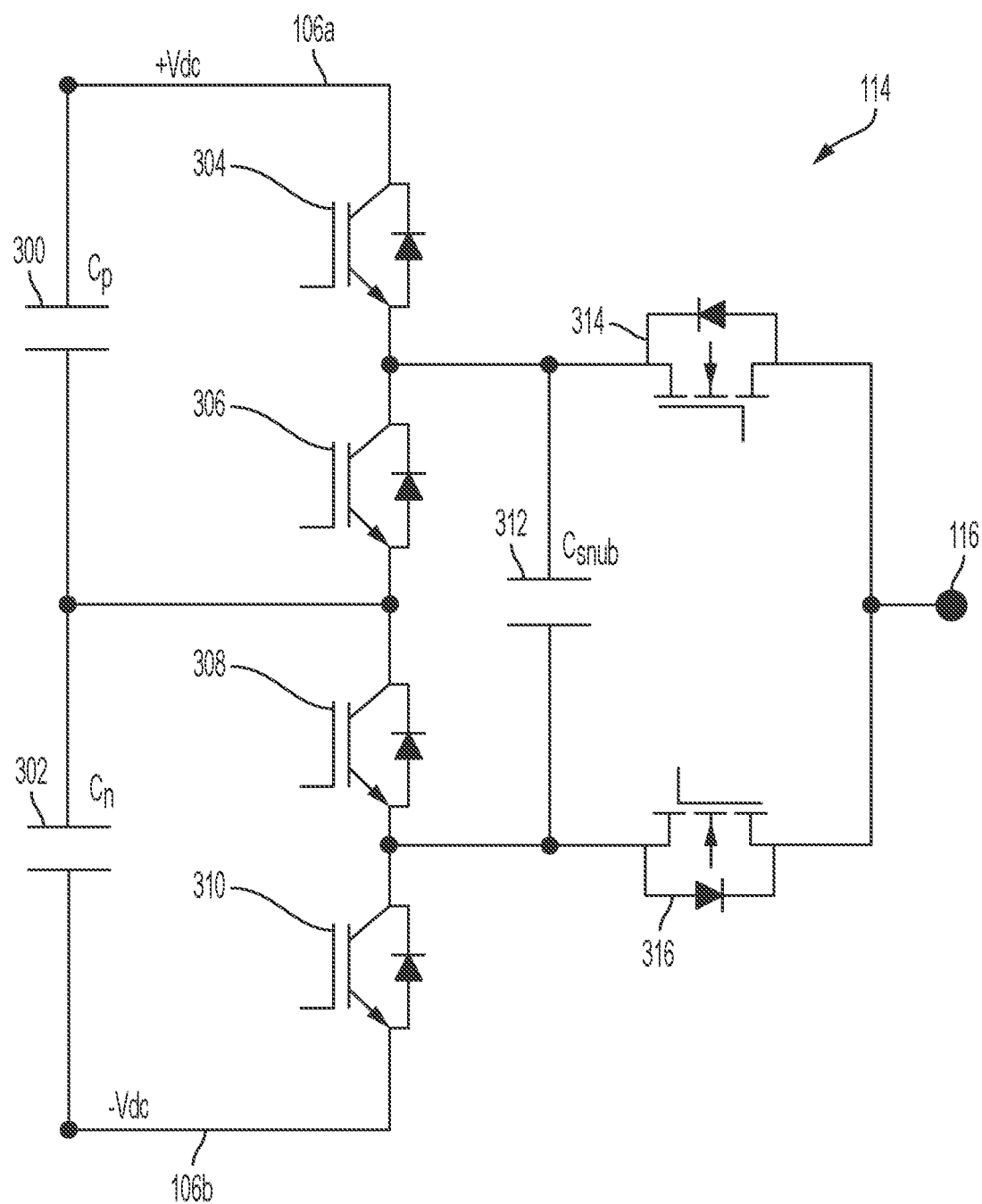
FIG. 3 illustrates a schematic diagram of an inverter according to an example.

FIG. 3 illustrates a schematic diagram of the DC/AC inverter 114 according to an example. The DC/AC inverter 114 may be implemented according to any of various topologies. FIG. 3 illustrates an example of the DC/AC inverter 114 implemented according to an active neutral-point clamped (ANPC) topology. However, the DC/AC inverter 114 is not limited to implementation in an ANPC topology, and the illustrated topology is provided for purposes of example only.

The DC/AC inverter 114 includes a first bus capacitor 300, a second bus capacitor 302, a first inverter switching device 304, a second inverter switching device 306, a third inverter switching device 308, a fourth inverter switching device 310, a snubber capacitor 312, a fifth inverter switching device 314, and a sixth inverter switching device 316. The DC/AC inverter 114 is coupled to the positive DC bus 106a and the negative DC bus 106b. The DC/AC inverter 114 is also coupled to the output 116.

The DC/AC inverter 114 may operate as a two-stage inverter in some examples. A first stage may include the first inverter switching device 304, the second inverter switching device 306, the third inverter switching device 308, and the fourth inverter switching device 310. The first-stage inverter switching devices 304-310 may be implemented as IGBT switches in some examples. A second stage may include the fifth inverter switching device 314 and the sixth inverter switching device 316. The second-stage inverter switching devices 314, 316 may be implemented as MOSFET switches in some examples.

The controller 112 may operate the switching devices 304-310, 314, 316 to convert bus DC power from the DC busses 106 to AC output power provided to one or more loads at the output 116. The controller 112 may operate the switching devices 304-310, 314, 316 according to any of various modulation schemes. In one example, the controller 112 may operate the first stage including the switching devices 304-310 at a line frequency to alternately couple the positive DC bus 106a and the negative DC bus 106b to the switching devices 314, 316. For example, the controller 112 may close the first inverter switching device 304 and the third inverter switching device 308 to couple the positive DC bus 106a to the switching devices 314, 316 during a positive portion of an output AC waveform. The controller 112 may close the second inverter switching device 306 and the fourth inverter switching device 310 to couple the negative DC bus 106b to the switching devices 314, 316 during a negative portion of the output AC waveform. By alternately coupling the switching devices 304, 308 and the switching devices 306, 310 to the snubber capacitor 312, a voltage across the snubber capacitor 312 may be a substantially DC voltage and, in some cases, may exhibit a small AC portion pulsing at line frequency if the DC busses 106a, 106b are imbalanced. The controller 112 may operate the second stage including the switching devices 314, 316 at a high frequency with varying pulse widths to produce AC power from the alternate positive DC-voltage power and negative DC-voltage power received from the first stage. The snubber capacitor 312 may negate at least a portion of stray inductance during operation of the switching devices 304-310, 314, 316.

In other examples, the controller 112 may implement different modulation schemes. For example, rather than operating the first-stage inverter switching devices 304-310 at a low frequency and the second-stage inverter switching devices 314, 316 at a high frequency, the controller 112 may operate the first-stage inverter switching devices 304-310 at a high frequency and the second-stage inverter switching devices 314, 316 at a low frequency. Accordingly, operation of the DC/AC inverter 114 is not limited to a single operation scheme.

As illustrated in FIGS. 1 and 2, the DC/DC converter 108 and the DC/AC inverter 114 may each be coupled directly to the one or more DC busses 106. As discussed above, the DC/DC converter 108 may be sensitive to voltage imbalances on the one or more DC busses 106 in certain implementations (for example, as discussed above), which may cause saturation of the transformer 212. Also as discussed above, the DC/AC inverter 114 may alternately couple the positive DC bus 106a and the negative DC bus 106b to the switching devices 314, 316 to convert the positive-voltage DC power and the negative-voltage DC power to AC power.

In various examples, a topology of the DC/DC converter 108 and the DC/AC inverter 114 may be integrated together such that the DC/DC converter 108 is coupled to the DC busses 106 via the DC/AC inverter 114. Rather than the DC/DC converter 108 being coupled directly to the DC busses 106, the DC/AC inverter 114 may alternately couple the positive DC bus 106a and the negative DC bus 106b to the DC/DC converter 108 in a similar manner that the DC/AC inverter 114 alternately couples the DC busses 106a, 106b to the second-stage inverter switching devices 314, 316. Accordingly, a risk of saturation of the transformer 212 may be significantly reduced or eliminated.

Figure 4:
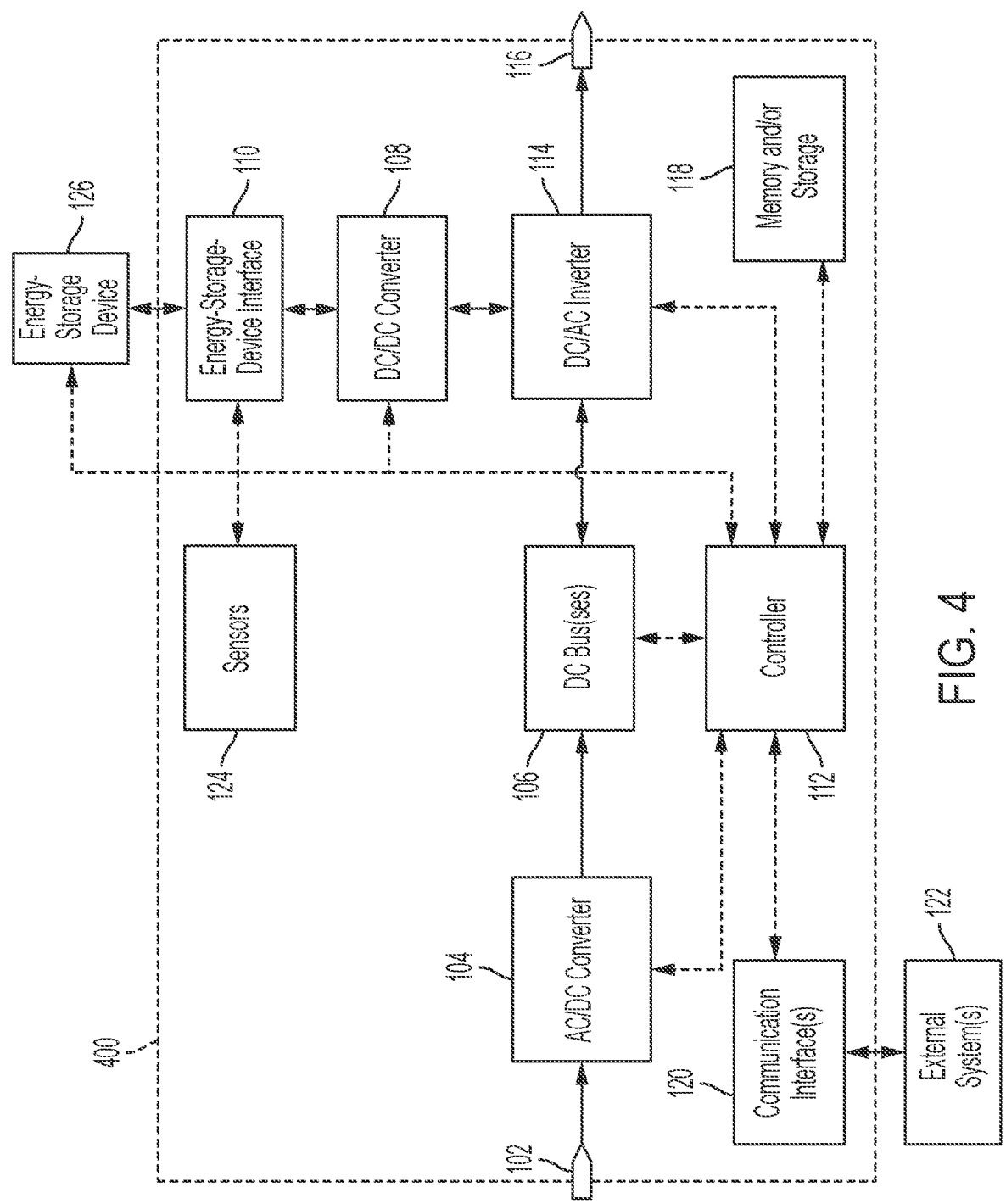
FIG. 4 illustrates a block diagram of an uninterruptible power supply according to an example.

FIG. 4 illustrates a block diagram of a UPS 400 according to an example. The UPS 400 may include substantially similar or identical blocks of components as the UPS 100, though the blocks of components may be implemented according to different topologies. Furthermore, components of the UPS 400 may be coupled differently than the components of the UPS 100.

For example, the UPS 400 includes the one or more DC busses 106, the DC/AC inverter 114, and the DC/DC converter 108. However, whereas the DC/DC converter 108 is coupled directly to the one or more DC busses 106 in the UPS 100, the DC/DC converter 108 is coupled to the one or more DC busses 106 via the DC/AC inverter 114 in the UPS 400. The controller 112 may control the DC/AC inverter 114 to alternately couple the positive DC bus 106a and the negative DC bus 106b to the DC/DC converter 108 in the UPS 400. In this manner, the controller 112 may reduce a risk of saturation of the transformer 212 of the DC/DC converter 108.

Figure 5:
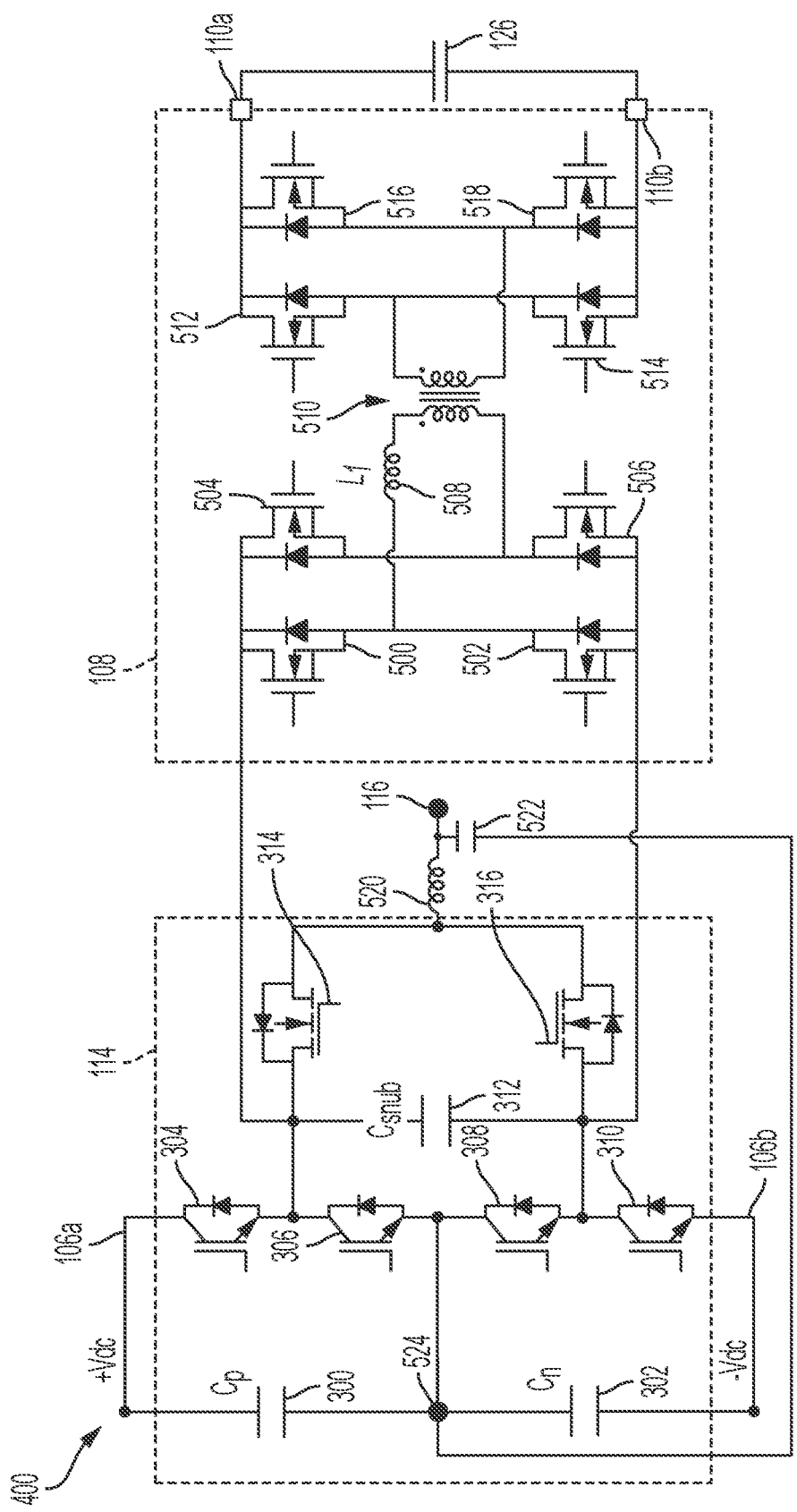
FIG. 5 illustrates a schematic diagram of an inverter and a DC/DC converter according to an example.

FIG. 5 illustrates a schematic diagram of components of the UPS 400 according to an example. For example, FIG. 5 illustrates the positive DC bus 106a, the negative DC bus 106b, the DC/DC converter 108, the first energy-storage-device-interface connection 110a, the second energy-storage-device-interface connection 110b, the DC/AC inverter 114, and the output 116. The DC/AC inverter 114 is configured in a two-stage topology substantially similar or identical to the topology illustrated in FIG. 3. The DC/DC converter 108 is configured in a two-stage topology similar to, but different from, the topology of FIG. 2. For example, whereas the topology of the DC/DC converter 108 in FIG. 2 implements a half bridge as the first stage, the topology of the DC/DC converter 108 in FIG. 5 implements a full bridge as the first stage. The principles of the disclosure are applicable to a wide variety of converter topologies and are not limited to the illustrated topologies, which are provided for purposes of example.

In one example, the DC/DC converter 108 of FIG. 5 includes a first converter switching device 500, a second converter switching device 502, a third converter switching device 504, a fourth converter switching device 506, an inductor 508, a transformer 510, a fifth converter switching device 512, a sixth converter switching device 514, a seventh converter switching device 516, and an eighth converter switching device 518. As discussed above with respect to FIG. 3, the DC/AC inverter 114 includes the first bus capacitor 300, the second bus capacitor 302, the first inverter switching device 304, the second inverter switching device 306, the third inverter switching device 308, the fourth inverter switching device 310, the snubber capacitor 312, the fifth inverter switching device 314, and the sixth inverter switching device 316. The UPS 400 further includes an output filter including an output inductor 520 and an output capacitor 522.

The first bus capacitor 300 is coupled to the positive DC bus 106a at a first connection, and is coupled to a reference node 524 (for example, a neutral node, return node, and/or ground node) at a second connection. The second bus capacitor 302 is coupled to the reference node 524 at a first connection, and is coupled to the negative DC bus 106b at a second connection.

The first inverter switching device 304 is coupled to the positive DC bus 106a at a first connection, and is coupled to the second inverter switching device 306, the snubber capacitor 312, the fifth inverter switching device 314, the first converter switching device 500, and the third converter switching device 504 at a second connection. The first inverter switching device 304 is configured to be communicatively coupled to the controller 112.

The second inverter switching device 306 is coupled to the first inverter switching device 304, the snubber capacitor 312, the fifth inverter switching device 314, the first converter switching device 500, and the third converter switching device 504 at a first connection, and is coupled to the reference node 524 at a second connection. The second inverter switching device 306 is configured to be communicatively coupled to the controller 112.

The third inverter switching device 308 is coupled to the reference node 524 at a first connection, and is coupled to the fourth inverter switching device 310, the snubber capacitor 312, the sixth inverter switching device 316, the second converter switching device 502, and the fourth converter switching device 506 at a second connection. The third inverter switching device 308 is configured to be communicatively coupled to the controller 112.

The fourth inverter switching device 310 is coupled to the third inverter switching device 308, the snubber capacitor 312, the sixth inverter switching device 316, the second converter switching device 502, and the fourth converter switching device 506 at a first connection, and is coupled to the negative DC bus 106b at a second connection. The fourth inverter switching device 310 is configured to be communicatively coupled to the controller 112.

The snubber capacitor 312 is coupled to the first inverter switching device 304, the second inverter switching device 306, the fifth inverter switching device 314, the first converter switching device 500, and the third converter switching device 504 at a first connection, and is coupled to the third inverter switching device 308, the fourth inverter switching device 310, the sixth inverter switching device 316, the second converter switching device 502, and the fourth converter switching device 506 at a second connection.

The fifth inverter switching device 314 is coupled to the first inverter switching device 304, the second inverter switching device 306, the snubber capacitor 312, the first converter switching device 500, and the third converter switching device 504 at a first connection, and is coupled to the output inductor 520 at a second connection (for example, via an inverter output between the switching devices 314, 316 and the output inductor 520). The fifth inverter switching device 314 is configured to be communicatively coupled to the controller 112.

The sixth inverter switching device 316 is coupled to the third inverter switching device 308, the fourth inverter switching device 310, the snubber capacitor 312, the second converter switching device 502, and the fourth converter switching device 506 at a first connection, and is coupled to the output inductor 520 at a second connection (for example, via the inverter output connection). The sixth inverter switching device 316 is configured to be communicatively coupled to the controller 112.

The first converter switching device 500 is coupled to the first inverter switching device 304, the second inverter switching device 306, the snubber capacitor 312, and the fifth inverter switching device 314 at a first connection, and is coupled to the second converter switching device 502 and the inductor 508 at a second connection. The first converter switching device 500 is configured to be communicatively coupled to the controller 112. The DC/DC converter 108 may therefore be coupled between the positive DC bus 106a and the inverter output at least inasmuch as the first connection of the first converter switching device 500 is coupled to the positive DC bus 106a via the first inverter switching device 304 and to the inverter output via the fifth inverter switching device 314.

The second converter switching device 502 is coupled to the first converter switching device 500 and the inductor 508 at a first connection, and is coupled to the third inverter switching device 308, the fourth inverter switching device 310, the snubber capacitor 312, and the sixth inverter switching device 316 at a second connection. The second converter switching device 502 is configured to be communicatively coupled to the controller 112. The DC/DC converter 108 may therefore be coupled between the negative DC bus 106b and the inverter output at least inasmuch as the second connection of the second converter switching device 502 is coupled to the negative DC bus 106b via the fourth inverter switching device 310 and to the inverter output via the sixth inverter switching device 316.

The third converter switching device 504 is coupled to the first inverter switching device 304, the second inverter switching device 306, the snubber capacitor 312, and the fifth inverter switching device 314 at a first connection, and is coupled to the fourth converter switching device 506 and a non-dotted pole of a primary winding of the transformer 510 at a second connection. The third converter switching device 504 is configured to be communicatively coupled to the controller 112. he DC/DC converter 108 may therefore be coupled between the positive DC bus 106a and the inverter output at least inasmuch as the first connection of the third converter switching device 504 is coupled to the positive DC bus 106a via the first inverter switching device 304 and to the inverter output via the fifth inverter switching device 314.

The fourth converter switching device 506 is coupled to the third converter switching device 504 and the non-dotted pole of the primary winding of the transformer 510 at a first connection, and is coupled to the third inverter switching device 308, the fourth inverter switching device 310, the snubber capacitor 312, and the sixth inverter switching device 316 at a second connection. The fourth converter switching device 506 is communicatively coupled to the controller 112. The DC/DC converter 108 may therefore be coupled between the negative DC bus 106b and the inverter output at least inasmuch as the second connection of the fourth converter switching device 506 is coupled to the negative DC bus 106b via the fourth inverter switching device 310 and to the inverter output via the sixth inverter switching device 316.

The inductor 508 is coupled to the first converter switching device 500 and the second converter switching device 502 at a first connection, and is coupled to a dotted pole of the primary winding of the transformer 510 at a second connection. The transformer 510 includes the primary winding having the dotted pole coupled to the inductor 508 and the non-dotted pole coupled to the third converter switching device 504 and the fourth converter switching device 506. The transformer 510 further includes a secondary winding inductively coupled to the primary winding and having a dotted pole coupled to the fifth converter switching device 512 and the sixth converter switching device 514, and a non-dotted pole coupled to the seventh converter switching device 516 and the eighth converter switching device 518.

The fifth converter switching device 512 is coupled to the first energy-storage-device-interface connection 110a at a first connection, and is coupled to the dotted pole of the secondary winding of the transformer 510 and the second converter switching device 514 at a second connection. The fifth converter switching device 512 is configured to be communicatively coupled to the controller 112.

The sixth converter switching device 514 is coupled to the fifth converter switching device 512 and the dotted pole of the secondary winding of the transformer 510 at a first connection, and is coupled to the second energy-storage-device-interface connection 110b at a second connection. The sixth converter switching device 514 is configured to be communicatively coupled to the controller 112.

The seventh converter switching device 516 is coupled to the first energy-storage-device-interface connection 110a at a first connection, and is coupled to the non-dotted pole of the secondary winding of the transformer 510 and the eighth converter switching device 518 at a second connection. The seventh converter switching device 516 is configured to be communicatively coupled to the controller 112.

The eighth converter switching device 518 is coupled to the seventh converter switching device 516 and the non-dotted pole of the secondary winding of the transformer 510 at a first connection, and is coupled to the second energystorage-device-interface connection 110*b* at a second connection. The eighth converter switching device 518 is configured to be communicatively coupled to the controller 112.

The output inductor 520 is coupled to the fifth inverter switching device 314 and the sixth inverter switching device 316 (for example, via the inverter output) at a first connection, and is coupled to the output capacitor 522 and the output 116 at a second connection. The output capacitor 522 is coupled to the output inductor 520 and the output 116 at a first connection, and is coupled to the reference node 524 at a second connection.

The positive DC bus 106*a* is coupled to the first bus capacitor 300 and the first inverter switching device 304. The positive DC bus 106*a* may be coupled to additional components not illustrated in FIG. 5, such as the AC/DC converter 104, which are omitted for purposes of clarity. The negative DC bus 106*b* is coupled to the second bus capacitor 302 and the fourth inverter switching device 310. The negative DC bus 106*b* may be coupled to additional components not illustrated in FIG. 5, such as the AC/DC converter 104, which are omitted for purposes of clarity.

The first energy-storage-device-interface connection 110*a* is coupled to the fifth converter switching device 512 and the seventh converter switching device 516, and is configured to be coupled to a positive terminal of the energy-storage device 126. The second energy-storage-device-interface connection 110*b* is coupled to the sixth converter switching device 514 and the eighth converter switching device 518, and is configured to be coupled to a negative terminal of the energy-storage device 126.

The output 116 is coupled to the output inductor 520 and the output capacitor 522. The output 116 may be coupled to additional components or devices not illustrated in FIG. 5, such as one or more loads, which are omitted for purposes of clarity. The energy-storage device 126 is configured to be coupled to the first energy-storage-device-interface connection 110*a* at the positive terminal, and is configured to be coupled to the second energy-storage-device-interface connection 110*b* at the negative terminal.

Figure 6:
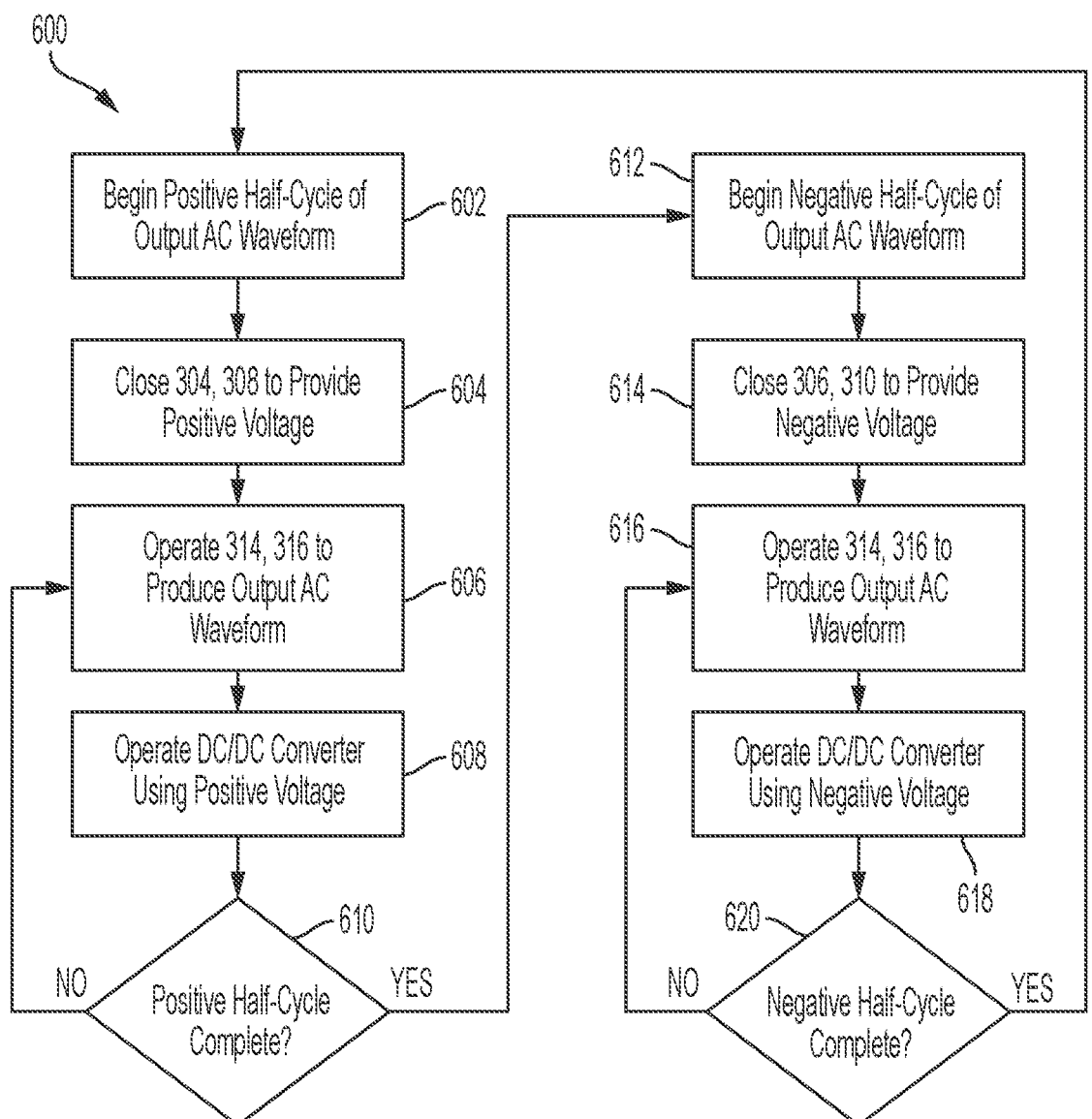
FIG. 6 illustrates a process of controlling an uninterruptible power supply according to an example.

As discussed above, the controller 112 may operate the DC/AC inverter 114 to alternately provide positive-voltage DC power and negative-voltage DC power to the DC/DC converter 108. FIG. 6 illustrates a process 600 of operating the UPS 400 according to an example. The process 600 may be executed by the controller 112. For example, the UPS 400 may include one or more computer-readable media storing instructions thereon that, when executed by the controller 112, cause the controller 112 to execute the process 600.

At act 602, the controller 112 begins operating the UPS 400 to output a positive half-cycle of an output AC waveform. For example, the UPS 400 may output the AC waveform to one or more loads at the output 116. The AC waveform may include a positive half-cycle and a negative half-cycle in some examples. In other examples, the AC waveform may include a positive portion and a negative portion in which the positive portion makes up greater than or less than half of the AC waveform and the negative portion makes up at least part of a remainder of the AC waveform. For purposes of explanation, examples are provided in which the AC waveform includes a positive half-cycle and a negative half-cycle.

At act 604, the controller 112 controls the first inverter switching device 304 and the third inverter switching device 308 to be closed and conducting. Closing the inverter switching devices 304, 308 couples the first bus capacitor 300 and the positive DC bus 106*a* to the inverter switching devices 314, 316 and the DC/DC converter 108, thereby applying a positive DC voltage to the inverter switching devices 314, 316 and to the DC/DC converter 108. As discussed below, act 606 describes operating the inverter switching devices 314, 316 using the positive DC voltage, and act 608 describes operating the DC/DC converter 108 using the positive DC voltage. The controller 112 may control the second inverter switching device 306 and the fourth inverter switching device 310 to remain (or transition to) open and non-conducting to isolate the DC/DC converter 108 from the negative DC bus 106*b*, which may include not controlling the second inverter switching device 306 and the fourth inverter switching device 310 to be closed and conducting (for example, if the inverter switching devices 306, 310 are normally open).

At act 606, the controller 112 operates the fifth inverter switching device 314 and/or the sixth inverter switching device 316 to produce the positive half-cycle of the output AC waveform. For example, the controller 112 may control the fifth inverter switching device 314 to alternately open and close at a relatively high frequency (for example, compared to the line frequency of the output AC waveform) to produce the positive half-cycle of the output AC waveform. Closing the fifth inverter switching device 314 couples the output 116 (for example, via the output inductor 520) to the positive DC bus 106*a* via the first inverter switching device 304 and the fifth inverter switching device 314, thereby enabling positive-voltage power to pass from the positive DC bus 106*a* to the output 116. The controller 112 may therefore produce a desired positive half-cycle AC output waveform using positive-voltage DC power received from the positive DC bus 106*a* by controlling the fifth inverter switching device 314 and/or the sixth inverter switching device 316.

At act 608, the controller 112 operates the DC/DC converter 108 to convert DC power using the positive-voltage DC power provided from the positive DC bus 106*a* via the first inverter switching device 304 and the third inverter switching device 308. Act 608 may be optionally executed in examples in which the energy-storage device 126 is not fully charged, such that it might be desirable to provide recharging power to the energy-storage device 126. If the controller 112 determines that the energy-storage device 126 is fully charged or otherwise above a recharging-threshold state of charge (SOC), act 608 may not be executed. In some examples, a voltage level of the one or more DC busses 106 (for example, about 400 V) may be substantially higher than a voltage level of the energy-storage device 126 (for example, about 48 V). Accordingly, the DC/DC converter 108 may step down bus DC voltage to battery DC voltage, and may step up battery DC voltage to bus DC voltage.

Act 608 may include coupling the positive DC bus 106*a* to the primary winding of the transformer 510 to induce a current in the secondary winding of the transformer 510. For example, the controller 112 may control the converter switching devices 500, 506 to be closed at a first point in time, and may control the converter switching devices 502, 504 to be closed at a second point in time, such that the positive voltage is alternately applied across the poles of the primary winding of the transformer 510. The controller 112 may operate the converter switching devices 512-518 in a similar manner to provide the induced current to the energy-storage device 126 as a recharging current.

Because the DC/DC converter 108 is coupled to the positive DC bus 106*a* via the closed inverter switching devices 304, 308, but is isolated from the negative DC bus 106*b* by the open inverter switching devise 306, 310, a risk of saturation of the transformer 510 due to a voltage imbalance on the DC busses 106a, 106b is reduced or eliminated. Accordingly, the controller 112 may operate the DC/DC converter 108 to provide a recharging current derived from the positive DC bus 106a to the energy-storage device 126 with a minimized or eliminated risk of saturation of the transformer 510.

At act 610, the controller 112 determines whether the positive half-cycle of the output AC waveform is complete. For example, the controller 112 may determine if half a period of the output AC waveform has elapsed since beginning to provide the negative half-cycle of the output AC waveform at act 602. If the positive half-cycle of the output AC waveform is not complete (610 NO), the process 600 returns to act 606. Acts 606-610 are repeated until a determination is made that the positive half-cycle of the output AC waveform is complete (610 YES), at which point the process 600 continues to act 612. Act 604 is not described as being repeated at least because the controller 112 may control the inverter switching devices 304, 308 to remain closed as acts 606-610 are repeatedly executed, that is, the inverter switching devices 304, 308 need not be closed again while acts 606-610 are repeatedly executed.

At act 612, the controller 112 begins operating the UPS 400 to output a negative half-cycle of an output AC waveform.

At act 614, the controller 112 controls the second inverter switching device 306 and the fourth inverter switching device 310 to be closed and conducting. Closing the inverter switching devices 306, 310 couples the second bus capacitor 302 and the negative DC bus 106b to the inverter switching devices 314, 316, thereby applying a negative DC voltage to the inverter switching devices 314, 316 and to the DC/DC converter 108. As discussed below, act 616 describes operating the inverter switching devices 314, 316 using the negative DC voltage, and act 618 describes operating the DC/DC converter 108 using the negative DC voltage. The controller 112 may control the first inverter switching device 304 and the third inverter switching device 308 to remain (or transition to) open and non-conducting to isolate the DC/DC converter 108 from the positive DC bus 106a, which may include not controlling the first inverter switching device 304 and the third inverter switching device 308 to be closed and conducting (for example, if the inverter switching devices 304, 308 are normally open).

At act 616, the controller 112 operates the fifth inverter switching device 314 and/or the sixth inverter switching device 316 to produce the negative half-cycle of the output AC waveform. For example, the controller 112 may control the sixth inverter switching device 316 to alternately open and close at a relatively high frequency (for example, compared to the line frequency of the output AC waveform) to produce the negative half-cycle of the output AC waveform. Closing the sixth inverter switching device 316 couples the output 116 (for example, via the output inductor 520) to the negative DC bus 106b via the fourth inverter switching device 310 and the sixth inverter switching device 316, thereby enabling negative-voltage power to pass from the negative DC bus 106b to the output 116. The controller 112 may therefore produce a desired negative half-cycle AC output waveform using negative-voltage DC power received from the negative DC bus 106b by controlling the fifth inverter switching device 314 and/or the sixth inverter switching device 316.

At act 618, the controller 112 operates the DC/DC converter 108 to convert DC power using the negative-voltage DC power provided from the negative DC bus 106b via the second inverter switching device 306 and the fourth inverter switching device 310. Act 618 may be optionally executed in examples in which the energy-storage device 126 is not fully charged, such that it might be desirable to provide recharging power to the energy-storage device 126. If the energy-storage device 126 is fully charged or otherwise above a recharging-threshold state of charge (SOC), act 618 may not be executed.

Act 618 may include coupling the negative DC bus 106b to the primary winding of the transformer 510 to induce a current in the secondary winding of the transformer 510. For example, the controller 112 may control the converter switching devices 500, 506 to be closed at a first point in time, and may control the converter switching devices 502, 504 to be closed at a second point in time, such that the negative voltage is alternately applied across the poles of the primary winding of the transformer 510. The controller 112 may operate the converter switching devices 512-518 in a similar manner to provide the induced current to the energy-storage device 126 as a recharging current.

Because the DC/DC converter 108 is coupled to the negative DC bus 106b via the closed inverter switching devices 306, 310, but is isolated from the positive DC bus 106a by the open inverter switching devise 304, 308, a risk of saturation of the transformer 510 due to a voltage imbalance on the DC busses 106a, 106b is reduced or eliminated. Accordingly, the controller 112 may operate the DC/DC converter 108 to provide a recharging current derived from the negative DC bus 106b to the energy-storage device 126 with a minimized or eliminated risk of saturation of the transformer 510.

At act 620, the controller 112 determines whether the negative half-cycle of the output AC waveform is complete. For example, the controller 112 may determine if half a period of the output AC waveform has elapsed since beginning to provide the negative half-cycle of the output AC waveform at act 612. If the negative half-cycle of the output AC waveform is not complete (620 NO), the process 600 returns to act 616. Acts 616-620 are repeated until a determination is made that the negative half-cycle of the output AC waveform is complete (620 YES), at which point the process 600 returns to act 602. Act 614 is not described as being repeated at least because the controller 112 may control the inverter switching devices 306, 310 to remain closed as acts 616-620 are repeatedly executed, that is, the inverter switching devices 306, 310 need not be closed again while acts 616-620 are repeatedly executed. The process 600 may then be repeated.

According, the process 600 provides a method for the controller 112 to control the inverter switching devices 304-310 to alternately provide positive-voltage DC power and negative-voltage DC power to the inverter switching devices 314, 316 and the DC/DC converter 108. By alternately coupling the positive and negative DC busses 106a, 106b to the DC/DC converter 108, rather than maintaining a direct connection between the DC busses 106a, 106b and the DC/DC converter 108, a risk of transformer saturation may be eliminated or reduced. Additionally, in various examples the switching device 500-506 and the transformer 510 may be subjected to a voltage drop from either of the DC busses 106a, 106b to the reference node 524, rather than a voltage drop from one of the DC busses 106a, 106b to the other, which may provide for a reduction in losses, cost, and size of components.

Figure 7:
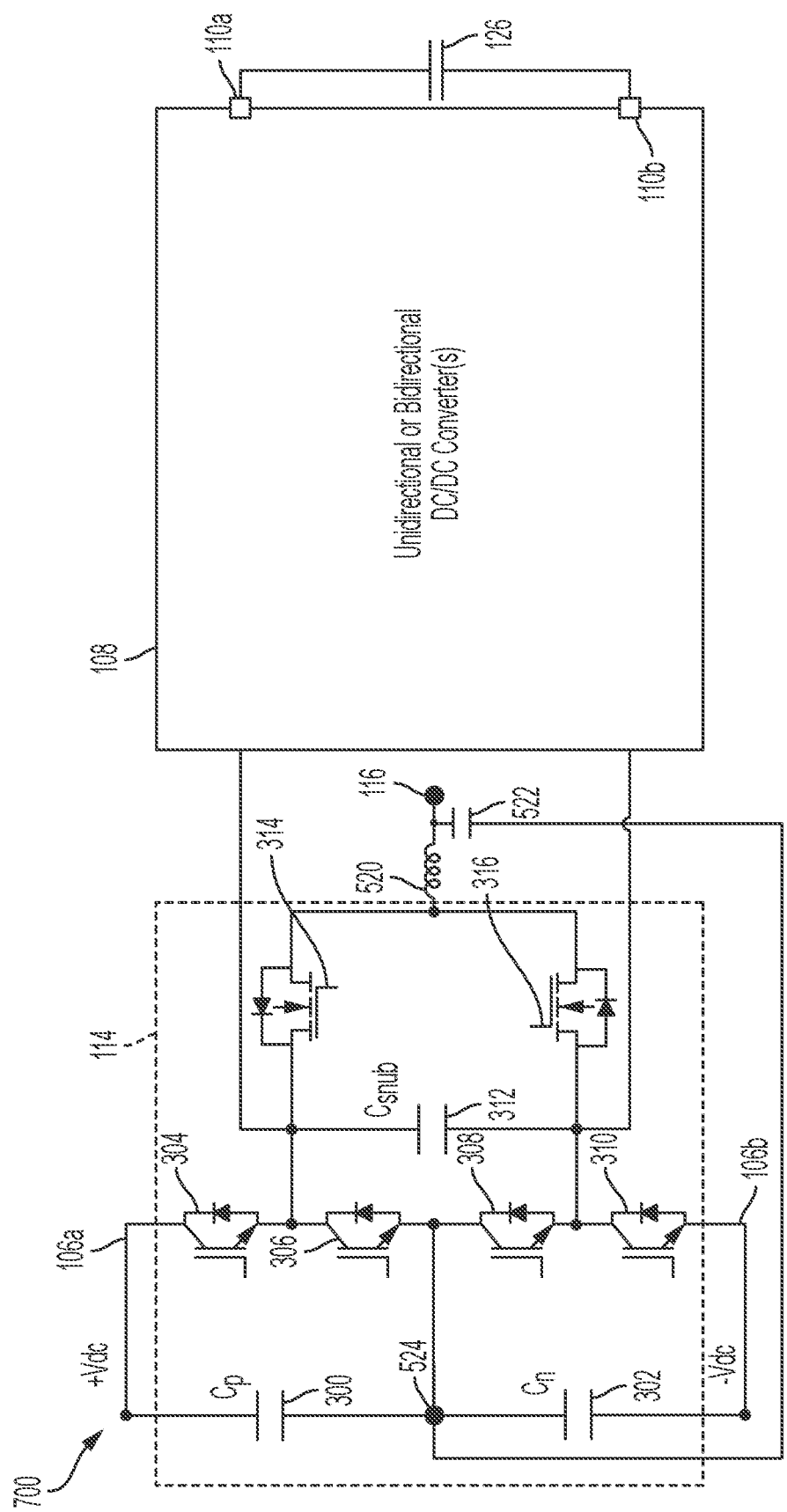
FIG. 7 illustrates a schematic diagram of an inverter and a DC/DC converter according to an example.

Although certain examples of the DC/DC converter 108 have been provided for purposes of explanation, the principles of the disclosure are not limited to the example implementations of the DC/DC converter 108. Although FIG. 5 illustrates an example in which the DC/DC converter 108 is implemented as a bidirectional DAB converter, alternative DC/DC converter topologies may be implemented, including unidirectional and/or bidirectional DC/DC converters. For example, FIG. 7 illustrates a schematic diagram of a UPS 700 in which the DC/DC converter 108 may be implemented as one or more unidirectional DC/DC converters, one or more bidirectional DC/DC converters, a combination of the foregoing, and so forth. Accordingly, the principles of the disclosure are not limited to DAB converters nor to bidirectional converters. Similarly, although in some examples the first inverter stage including the inverter switching devices 304-310 may be controlled to switch at a low frequency (for example, a line frequency) and the second inverter stage including the inverter switching devices 314, 316 may be controlled to switch at a high frequency, in other examples other modulation schemes may be implemented.

Acts of the process 600 may not be executed sequentially. For example, acts 606, 608, and 610 may all be executed repeatedly and substantially simultaneously until a determination is made that the positive half-cycle of the AC output waveform is complete (610 YES). Similarly, acts 616, 618, and 620 may all be executed repeatedly and substantially simultaneously until a determination is made that the negative half-cycle of the AC output waveform is complete (620 YES). Furthermore, in various examples acts 602 and 612 may not include actions affirmatively executed by the controller 112, and may instead be provided for clarity of explanation.

In various examples, components may be added to or removed from the UPS 400. In some examples, the snubber capacitor 312 may be implemented as illustrated. The snubber capacitor 312 may advantageously mitigate stray inductances. In other examples, the snubber capacitor 312 may be omitted and replaced with an open circuit. Removing the snubber capacitor 312 may advantageously reduce losses.

Although examples have been provided in which an inverter and a DC/DC converter are coupled together in a UPS, the principles of the disclosure are not limited to UPSs. For example, the inverter and DC/DC converter topologies and modulation schemes may be implemented in any of various other power systems, such as electric vehicle systems, mobile phone systems, microgrid systems, and so forth.

Various controllers, such as the controller 112, may execute various operations discussed above. Using data stored in associated memory and/or storage, the controller 112 also executes one or more instructions stored on one or more non-transitory computer-readable media, which the controller 112 may include and/or be coupled to, that may result in manipulated data. In some examples, the controller 112 may include one or more processors or other types of controllers. In one example, the controller 112 is or includes at least one processor. In another example, the controller 112 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A power system comprising:
a power-system output configured to be coupled to, and provide an output AC waveform including a positive cycle and a negative cycle to, one or more loads;
a positive DC bus;
a negative DC bus;
an inverter coupled to the positive DC bus and the negative DC bus, the inverter including an inverter output coupled to the power-system output; and
a DC/DC converter coupled between the inverter output and at least one of the positive DC bus or the negative DC bus,
wherein the inverter is configured to:
provide, during the positive cycle, positive-voltage power to the DC/DC converter; and
provide, during the negative cycle, negative-voltage power to the DC/DC converter.

2. The power system of claim 1, wherein the positive DC bus and the negative DC bus are configured to be coupled to at least one energy-storage device.

3. The power system of claim 2, wherein the DC/DC converter is configured to execute one or both of:
providing, via at least one of the positive DC bus or the negative DC bus, output power to the at least one energy-storage device, and
receiving, via at least one of the positive DC bus or the negative DC bus, input power from the at least one energy-storage device.

4. The power system of claim 1, wherein the inverter includes a plurality of switches coupled between the inverter output and the power-system output.

5. The power system of claim 4, wherein the inverter includes a snubber capacitor coupled in parallel with the plurality of switches.

6. The power system of claim 4, wherein the inverter further comprises:
a first set of one or more inverter switches coupled to a positive-DC-power source at a first connection and to the plurality of switches at a second connection, and
a second set of one or more inverter switches coupled to a negative-DC-power source at a third connection and to the plurality of switches at a fourth connection.

7. The power system of claim 1, wherein the inverter further comprises:
a first set of one or more inverter switches coupled to a positive-DC-power source at a first connection and to the inverter output at a second connection, and
a second set of one or more inverter switches coupled to a negative-DC-power source at a third connection and to the inverter output at a fourth connection.

8. The power system of claim 1, wherein the inverter further comprises a set of one or more inverter switches coupled to a power source at a first connection and to the inverter output at a second connection.

9. The power system of claim 8, wherein the power source includes a capacitor, and wherein the set of one or more inverter switches is coupled in parallel with the capacitor.

10. A non-transitory computer-readable medium storing thereon sequences of computer-executable instructions for controlling a power system including a positive DC bus, a negative DC bus, an output, an inverter including an inverter output, and a DC/DC converter coupled between the inverter output and at least one of the positive DC bus or the negative DC bus, the sequences of computer-executable instructions including instructions that instruct at least one processor to:
   control the inverter to provide an output AC waveform to the output;
   control, during a positive portion of the output AC waveform, the inverter to couple the positive DC bus to the DC/DC converter; and
   control, during the positive portion of the output AC waveform, the inverter to isolate the negative DC bus from the DC/DC converter.

11. The non-transitory computer-readable medium of claim 10, wherein the instructions further instruct the at least one processor to:
   control, during a negative portion of the output AC waveform, the inverter to couple the negative DC bus to the DC/DC converter; and
   control, during the negative portion of the output AC waveform, the inverter to isolate the positive DC bus from the DC/DC converter.

12. The non-transitory computer-readable medium of claim 11, wherein the instructions further instruct the at least one processor to control, during the negative portion of the output AC waveform, the DC/DC converter to provide power derived from the negative DC bus to at least one energy-storage device.

13. The non-transitory computer-readable medium of claim 10, wherein the instructions further instruct the at least one processor to control, during the positive portion of the output AC waveform, the DC/DC converter to provide power derived from the positive DC bus to at least one energy-storage device.

14. The non-transitory computer-readable medium of claim 10, wherein the instructions further instruct the at least one processor to control, during the positive portion of the output AC waveform, the inverter to:
   draw power from the positive DC bus;
   provide a first portion of the drawn power to the output; and
   provide a second portion of the drawn power to the DC/DC converter.

15. The non-transitory computer-readable medium of claim 10, wherein the instructions further instruct the at least one processor to control, during a negative portion of the output AC waveform, the inverter to:
   draw power from the negative DC bus;
   provide a first portion of the drawn power to the output; and
   provide a second portion of the drawn power to the DC/DC converter.

16. A method of controlling a power system including a positive DC bus, a negative DC bus, an output, an inverter having an inverter output, and a DC/DC converter coupled between the inverter output and at least one of the positive DC bus or the negative DC bus, the method comprising:
   controlling the inverter to provide an output AC waveform to the output;
   controlling, during a positive portion of the output AC waveform, the inverter to couple the positive DC bus to the DC/DC converter; and
   controlling, during the positive portion of the output AC waveform, the inverter to isolate the negative DC bus from the DC/DC converter.

17. The method of claim 16, further comprising:
   controlling, during a negative portion of the output AC waveform, the inverter to couple the negative DC bus to the DC/DC converter; and
   controlling, during the negative portion of the output AC waveform, the inverter to isolate the positive DC bus from the DC/DC converter.

18. The method of claim 17, further comprising controlling, during the negative portion of the output AC waveform, the DC/DC converter to provide power derived from the negative DC bus to at least one energy-storage device.

19. The method of claim 16, further comprising controlling, during the positive portion of the output AC waveform, the DC/DC converter to provide power derived from the positive DC bus to at least one energy-storage device.

\* \* \* \* \*